(12) United States Patent
Belcher et al.

(10) Patent No.: US 6,393,045 B1
(45) Date of Patent: May 21, 2002

(54) SPREAD SPECTRUM BASEBAND MODULATION OF MAGNETIC FIELDS FOR COMMUNICATIONS AND PROXIMITY SENSING

(75) Inventors: Donald K. Belcher; Ronald J. Hash, both of Rogersville; Robert W. Boyd, Eidson, all of TN (US)

(73) Assignee: Wherenet Corp., Santa Clara, CA (US)

( * ) Notice: Subject to any disclaimer, the term of this patent is extended or adjusted under 35 U.S.C. 154(b) by 0 days.

(21) Appl. No.: 09/159,553

(22) Filed: Sep. 24, 1998

Related U.S. Application Data
(60) Provisional application No. 60/060,185, filed on Sep. 26, 1997.

(51) Int. Cl.[7] .............................. H04L 27/30; A61F 2/06; H04Q 5/22; H04Q 1/100
(52) U.S. Cl. .................. 375/130; 340/1; 340/10.41
(58) Field of Search .......................... 340/10.2, 825.54, 340/151, 152, 10.41, 10.1; 250/566; 342/44; 370/69.1; 375/130

(56) References Cited

U.S. PATENT DOCUMENTS

| | | | | |
|---|---|---|---|---|
| 3,754,250 A | * | 8/1973 | Bruner ........................ 340/151 |
| 3,964,024 A | * | 6/1976 | Hutton et al. ................ 340/152 |
| 4,160,971 A | * | 7/1979 | Jone et al. ................... 340/152 |
| 4,215,342 A | * | 7/1980 | Horowitz ..................... 340/572 |
| 4,691,202 A | * | 9/1987 | Denne et al. .......... 340/825.54 |
| 5,070,500 A | * | 12/1991 | Horinouchi et al. ....... 370/69.1 |
| 5,430,441 A | | 7/1995 | Bickley et al. ......... 340/825.54 |
| 5,478,991 A | | 12/1995 | Watanabe et al. ............ 235/375 |
| 5,485,154 A | | 1/1996 | Brooks et al. ................. 342/44 |
| 5,497,140 A | * | 3/1996 | Tuttle .......................... 342/51 |
| 5,561,430 A | * | 10/1996 | Knebelkamp ................ 342/44 |
| 5,712,630 A | * | 1/1998 | Nanboku et al. ....... 340/825.54 |
| 5,745,037 A | * | 4/1998 | Guthrie et al. .............. 340/573 |
| 5,818,348 A | * | 10/1998 | Walczak et al. ........ 340/825.54 |
| 5,825,045 A | * | 10/1998 | Koenck et al. ............. 250/566 |
| 5,828,693 A | * | 10/1998 | Mays et al. .................. 375/132 |
| 5,920,287 A | * | 7/1999 | Belcher et al. .............. 342/450 |
| 6,058,374 A | * | 5/2000 | Guthrie et al. ................ 705/28 |
| 6,064,335 A | * | 5/2000 | Eschenbach ................. 342/357 |
| 6,072,383 A | * | 6/2000 | Gallagher, III et al. .... 340/10.2 |
| 6,078,251 A | * | 6/2000 | Landt et al. ............. 340/10.41 |
| 6,150,921 A | * | 11/2000 | Werb et al. ................. 340/10.1 |
| 6,219,596 B1 | * | 4/2001 | Fukae et al. .................. 701/23 |
| 6,243,366 B1 | * | 6/2001 | Bradley et al. .............. 370/318 |

* cited by examiner

*Primary Examiner*—Chi Pham
*Assistant Examiner*—Tony Al-Beshrawi
(74) *Attorney, Agent, or Firm*—Allen, Dyer, Doppelt, Milbrath & Gilchrist, P.A.

(57) ABSTRACT

A magnetic field-based tagged object information storage and retrieval system employs a spread spectrum modulated magnetic field for identifying each of a plurality of tagged objects to which spread spectrum modulation magnetic field transponders are attached. When interrogated by a tag reader, transponders embedded in plural tags generate spread spectrum modulated magnetic fields that are correlated with a reference spreading sequence in a tag reader signal processor to both detect and identify each responding tag.

16 Claims, 3 Drawing Sheets

SPREAD SPECTRUM BASEBAND MODULATION OF MAGNETIC FIELDS FOR COMMUNICATIONS AND PROXIMITY SENSING

CROSS-REFERENCE TO RELATED APPLICATION

The present application claims the benefit of Provisional Patent Application Serial No. 60/060,185, filed Sep. 26, 1997, entitled: "Wibar Signaling Scheme," assigned to the assignee of the present application and the disclosure of which is incorporated herein.

FIELD OF THE INVENTION

The present invention relates in general to magnetic field-based communication and proximity detection systems, and is particularly directed to a tagged object information storage and retrieval system, that employs a spread spectrum modulated magnetic field for identifying each of a plurality of tagged objects to which spread spectrum modulation magnetic field transponders are attached. When interrogated by a tag reader, transponders embedded in one or more tags generate spread spectrum modulated magnetic fields that are correlated with a reference spreading sequence in a tag reader signal processor to both detect and identify each responding tag.

BACKGROUND OF THE INVENTION

The identification of objects, such as packages, retail sales items, shipping containers, and the like, is often accomplished by affixing to the object an information storage medium such as a 'bar code' label encoded with previously assembled and stored information that fully describes the object. In order to read a bar code label, the labelled object must be oriented so that the bar code may be 'viewed' by an optical (e.g. laser) scanner, either as a stationary device or a hand held unit. A familiar example of the use of such a scanner is a check-out line of a retail sales establishment, where a clerk orients each item with the bar code label face down, and then passes the item across an optical scanner viewing window. As the object is passed over the window, the bar code is read by the scanner, which outputs data to an adjacent point-of-sales terminal, where the transaction is processed. If the object is not properly oriented so as to allow the scanner to read the label, the sales clerk will not hear an audible tone confirming success of the scan, and will repeat the process.

A similar technique is employed in the transportation industry, where items such as baggage being unloaded from a vehicle are placed upon a conveyor belt in a prescribed orientation, so that they may be viewed by the scanner. If the object has not been properly placed on the conveyor, the object will require further handling to ensure that the bar code label can be read by a downstream scanner. This need to physically orient encoded label-containing items relative to an optical scanner is both labor-intensive and time-consuming, and constitutes an unwanted expense.

Non-limiting examples of proposals to remedy this viewing orientation problem include a variety of what are generally referred to as "RFID" (radio frequency identification) systems. Non-limiting examples of such RFID systems which employ magnetic fields are described in the U.S. Patents to Bickley et al, U.S. Pat. No. 5,430,441; Watanabe et al, U.S. Pat. No. 5,478,991; and Brooks et al, U.S. Pat. No. 5,485,154. In each of these schemes, a tag transponder is powered from a continuously generated magnetic field. In the Bickley et al and Watanabe et al approaches the transponder responds by modulating that same continuously transmitted electromagnetic field. In the Brooks et al scheme, the tag responds by generating a signal at a frequency different from the exciting frequency to avoid interference. An obvious drawback of these patented approaches is the fact that they continuously consume power. Indeed, in the Brooks et al scheme, the amount of excitation energy required is so large, that it requires the use of a shielded tunnel to prevent electromagnetic contamination of the surrounding environment.

SUMMARY OF THE INVENTION

In accordance with the present invention, a tagged object information storage and retrieval system employs a spread spectrum modulated magnetic field for locating and identifying a tagged object. Not only does spread-spectrum signaling provide a substantial degree of immunity against interferers, but effectively immunizes each transponder against its own signal, because of the extremely low probability of that signal being precisely time-aligned with those of other receivers. As a consequence, multiple transponders emitting the same spread magnetic field in response to an interrogation stimulus from a tag reader may be independently detected.

The transponder circuitry of a respective tag may be affixed to an object by means of adhesively backed strip of protective material, that contains a thin coil. The coil is coupled to a power bus, through which electrical power is extracted, rectified and stored from an intercepted excitation magnetic field and supplied to the transponder circuitry, when the coil is intercepted by a time varying magnetic field, such as a low duty cycle repetitive excitation pulse generated by the tag reader. The transponder coil is also further coupled to a reply energy storage capacitor, which stores extracted energy to be controllably applied to the coil by way of a modulated FET switch to generate a spread spectrum-modulated magnetic field that contains information stored in the transponder's non-volatile memory during a response mode of operation of the transponder.

The coil output is further coupled to a pulse counter, which controls the mode of operation of a transponder state machine, in accordance with the number of half cycles in each excitation magnetic field burst from the reader. When enabled during a 'response' mode of operation, the state machine accesses data stored in memory in preparation for transmission in a spreading signal-based reply message. The state machine gates the FET switch with the spreading signal, as exclusive-OR modulated by the data, so as to cause a baseband spread magnetic field to be emitted from the transponder coil.

The reader includes a pulse generator, which is coupled to a multiple excitation and interrogate/reader coil arrangement, in which receiver coils are arranged close to the excitation coil and are connected in opposite polarity. This arrangement produces an electrical output representative of a differential combination of responses from all impinging magnetic fields. As a result, energy received from the excitation coil and relatively distant sources is canceled, while providing a useful net output for a field generated by a nearby (object-tagged) transponder. The output from the reader coils is clamped, filtered and digitized for application to a digital correlator, which correlates the response emitted from the interrogated tag's transponder with a replica of the spreading signal.

The high probability that no two responses from tag transponders will be time-aligned or have exactly the same clock frequency (due to variations in their internal clocks) will tend to decorrelate their responses, even if they commense at the same time. This allows matched filter processing of the responses, for the purpose of individually segregating each response, even though each transponder employs the same PN sequence to spread its own signal.

DETAILED DESCRIPTION

Figure 1:
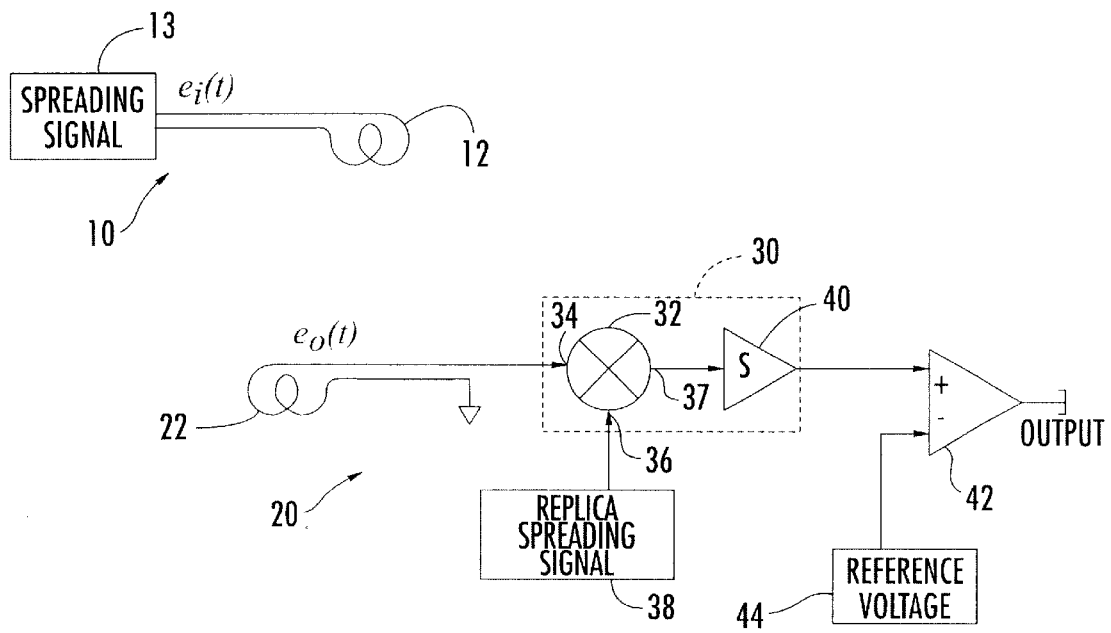
FIG. 1 diagrammatically shows an example of a magnetic field emitter device having a magnetic field generation coil to which a spreading voltage signal is applied.

Before detailing the spread spectrum-modulated magnetic field object detection and identification scheme of the present invention, it should be observed that the invention resides primarily in what is effectively an arrangement of magnetic field generation and associated electrical signal processing circuits and components, that control the operation of and respond to outputs from the magnetic field generation components. Consequently, the configuration of such circuits and components and the manner in which they are interfaced with other communication system equipment have, for the most part, been illustrated in the drawings by block diagrams, which show only those specific details that are pertinent to the present invention, so as not to obscure the disclosure with details which will be readily apparent to those skilled in the art having the benefit of the description herein. Thus, the block diagram illustrations to be described are primarily intended to show the major components of the system in a convenient functional grouping, whereby the present invention may be more readily understood.

As a precursor to describing the architecture and operation of the invention, it is initially useful to review some of the characteristics of spread spectrum techniques in common usage today for radio communications. One of the key advantages of spread-spectrum signaling is its ability to provide a substantial degree of immunity against interferers. In addition, spreading sources also provide immunity against their own signal, if that signal is not precisely time-aligned with the receivers. It is this feature—requiring that the signals to be precisely time-aligned—which allows a receiver to receive several signals occurring simultaneously. For example, if ten transmitters are transmitting a signal modulated with the same "spreading code", each of these signals may be independently received, if the spreading codes or signals are not exactly aligned in time.

The present invention exploits these signal processing advantages of spread spectrum signaling to improve the performance of magnetic field links for object detection and identification. Magnetic field links, which can be used for both short range communications and proximity sensing, differ from conventional radio signals, as they are not considered to be "radiated" fields in the classic definition of radio frequency (RF) antennas. By this, it is meant that energy applied to the magnetic field generator does not actually "radiate" into space, but rather forms a closed magnetic flux loop in the near vicinity of the magnetic field source, much in the same manner as the fields in a power transformer. If an intended receiving device is brought within the influence of this looped or recirculating magnetic field, an electrical signal can be induced in the receiving device.

To illustrate this effect, it is useful to consider the operation of a standard electrical transformer. A magnetic field link may be considered as an AC transformer, where the signal in the transformer's "primary" winding or coil (the transmitter antenna) is coupled through space to a "secondary" winding (the receive antenna). The coupling mechanism is the AC magnetic field. In free space, the amplitude of this coupled magnetic field energy is inversely proportional to the third power of the distance between the transmitter and receiver. This means that the power density of the coupled energy will be inversely proportional to the sixth power of distance. This steep exponential characteristic makes the use of a magnetic field ideal where it is undesirable for a detection field to radiate over a long distance.

In accordance with the present invention, spread spectrum baseband modulation of a magnetic field is used to enable a plurality of identical signals to be received simultaneously. The fundamental mechanism of the present invention may be understood with reference to the diagrammatic illustration of FIG. 1, which shows a magnetic field transmitting or emitter device 10, such as may be installed in a tag-embedded transponder attached to an object, having a magnetic field generation coil 12, to which a time varying electrical spreading (PN sequence-modulated) voltage $e_i(t)$ generated by a spreading signal source 13 is applied.

The magnetic field emanating from the transmitter's magnetic field generation coil 12 as a result of the spreading voltage $e_i(t)$ is shown as being intercepted or received by a magnetic field receiving coil 22 of a receiver device 20. The output of the receiving coil 22 is an electrical response voltage $e_o(t)$, that is proportional to the integral of the replica of the spreading signal voltage $e_i(t)$. This received signal $e_o(t)$ is applied to a spreading signal correlator 30. Correlator 30 is shown as comprising a multiplier 32 having a first input 34 to which the received signal $e_o(t)$ is applied, and a second input 36 to which a replica 38 of the electrical spreading voltage signal e(t) is applied. The output 37 of the multiplier 30 is integrated in an integrator 40 and then compared in a comparator 42 with a reference voltage 44. The output of the comparator 42 is representative of the degree of correlation of the received spread signal $e_o(t)$ with the replica of the reference spreading voltage $e_o(t)$.

Figure 2:
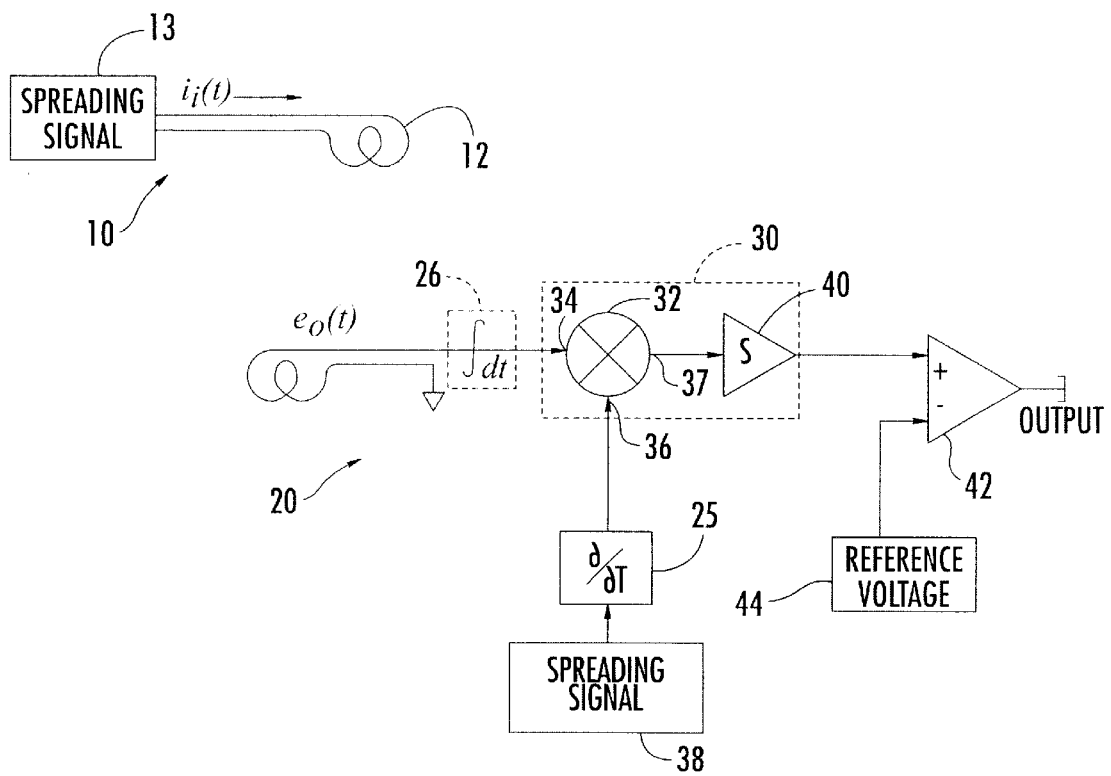
FIG. 2 diagrammatically shows an example of a magnetic field emitter device having a magnetic field generation coil to which a spreading current signal is applied.

FIG. 2 shows an example where the magnetic field intensity is proportional to a spreading current $i_i(t)$. In this embodiment, the output of the magnetic field transmitting device 10 is a time varying electrical spreading current signal $i_i(t)$, rather than the spreading voltage signal $e_i(t)$. As a result, the output of the receiving coil 22, as shown in FIG. 1, is an electrical voltage $e_o(t)$, which is proportional to the derivative of the magnetic field intensity or current $i_i(t)$. It is therefore necessary to form the time derivative of the replica of the spreading signal or to integrate the output voltage $e_o(t)$ of the receiving coil 22 in order to correlate the two signals. This may be effected by differentiating the spreading signal, as shown at 25, or by integrating the output voltage from the receiver coil 22, as shown at 26.

A significant aspect of directly spreading a magnetic field is that correlation can be used to combine energy transmitted over a large bandwidth and a long period of time, thus providing a substantial amount of signal processing gain relative to that of a conventional non-spread signal. A major difference between the invention and other (e.g., "RF") spread spectrum systems is that the invention does not use a carrier frequency; all communications and signal processing are carried out at baseband.

As described above, a spread spectrum-modulated magnetic link can be used as a proximity detector due to the very steep field gradient associated with magnetic fields. It may also be used to transfer data between two devices, where a transmitter unit is typically configured as a transponder installed in a tag, while an associated receiver is typically installed in a reader device installed at a monitoring station.

Figure 3:
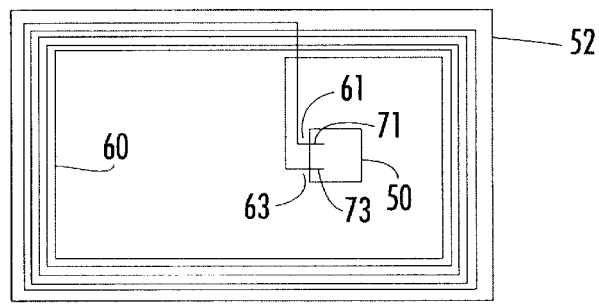
FIG. 3 diagrammatically illustrates an embodiment of circuitry for implementing the functionality of the spread spectrum modulated magnetic field emitter of FIGS. 1 and 2, as installed in a tag-embedded transponder.
Figure 4:
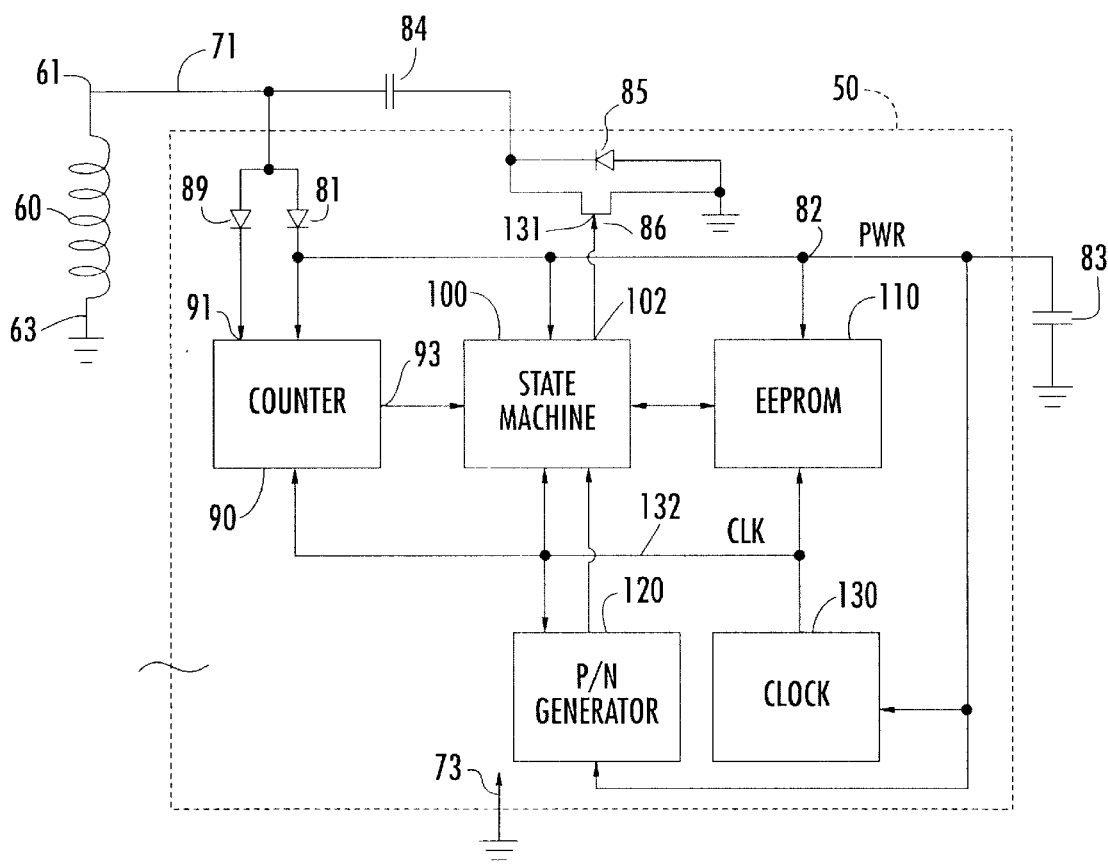
FIG. 4 shows a microcircuit implementation of the tag-embedded transponder of FIG. 3.

FIG. 3 diagrammatically illustrates an embodiment of circuitry for implementing the functionality of the spread spectrum modulated magnetic field emitter of FIGS. 1 and 2, as installed in a tag-embedded transponder, a microcircuit implementation of which is shown in detail in FIG. 4, to be described. The transponder circuitry, shown at 50, may be configured as described in co-pending U.S. patent Application Ser. No. 09/159,554, now issued U.S. Pat. No. 6,170,748 issued on Jan. 9, 2001, filed coincident herewith, by D. K. Belcher et al, entitled: "Object Identification System Employing Pulsed Magnetic Field-Stimulated, Tag-Embedded Transponder." Such co-pending application is a continuation-in-part of parent U.S. patent application Ser. No. 08/779,302, filed Jan. 6, 1997, by D. Belcher et al, entitled: "Object Identification System Employing Orientation-Independent, Magnetic Field-Stimulated, Tag-Embedded Transponder." Each of these applications is assigned to the assignee of the present application and their disclosures are incorporated herein.

As shown in FIG. 3, the transponder circuitry is embedded in or attached to an adhesively backed, flexible strip 52 of rugged, protective material, such as Mylar. To provide wireless (magnetic field-based) powering of and stimulate the transmission of a reply message from the transponder's circuitry, the flexible protective strip 52 further includes a thin conductive coil 60, such as a multi-turn (spiral-configured) layer of copper ribbon.

Terminal ends 61 and 63 of the coil 60 are coupled to respective power bus leads 71 and 73 through which power is extracted from an intercepted excitation magnetic field and supplied to the components of the transponder 50. The number of turns of the coil 60 is selected in accordance with the excitation magnetic field level with which the transponder is expected to operate. For relatively low magnetic field excitation levels, coil 60 may have a relatively large number of turns (e.g., fifty or more, as a non-limiting example).

Figure 5:
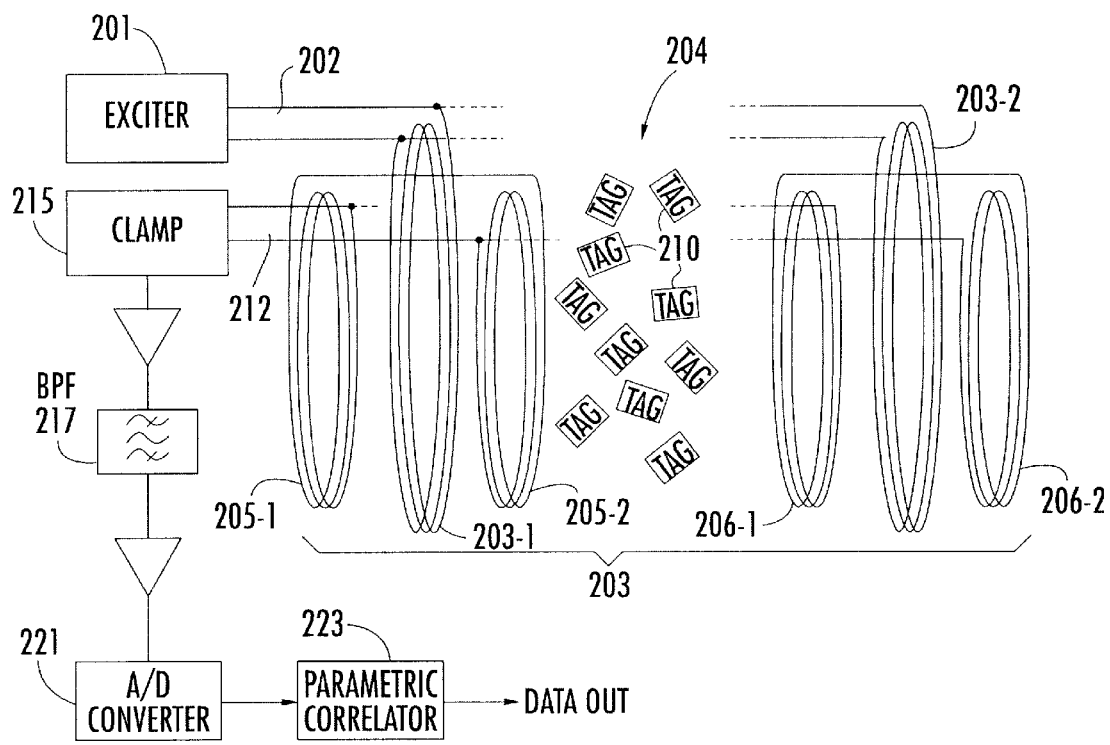
FIG. 5 diagrammatically illustrates the circuitry of a tag reader.

When the transponder coil 60 is intercepted by or passes through a relatively large amplitude, time varying or alternating magnetic field, such as a low duty cycle repetitive excitation pulse produced by the tag reader diagrammatically illustrated in FIG. 5, a voltage is induced across the transponder's power bus leads 71 and 73 in proportion to the time derivative of the alternating magnetic field passing through the coil. Depending upon the strength of the alternating magnetic field burst and component parameters, a voltage on the order of two to three volts, which is sufficient to power the transponder circuit 50, is repetitively induced across power bus leads 71 and 73.

As shown in detail in FIG. 4, to extract and store power from each magnetic field excitation burst, the transponder circuit 50 may comprise a first half-wave rectifier diode 81 coupled in circuit with the power bus lead 71 from the transponder coil 60 through a power bus 82 to a first power burst storage capacitor 83, which is coupled to a reference potential terminal (GND), to which the power bus lead 71 from coil terminal 61 is coupled. The orientation of diode 81 is such that the power burst storage capacitor 83 stores electrical energy during successive positive cycles of the interrogation magnetic field burst. The power burst storage capacitor 83 is then used to power the components of the transponder circuitry by way of the power bus 82.

The terminal end 61 of the transponder coil 60 is further coupled to a reply energy storage capacitor 84, which is coupled to ground through a second half-wave rectifier diode 85. Diode 85 has a polarity orientation such that the reply energy storage capacitor 84 stores energy during successive negative half cycles of an interrogation magnetic pulse. The energy stored in capacitor 84 is used in conjunction with the transponder coil 60 and a controllably gated FET switch 86 coupled across diode 85, to generate a spread spectrum-modulated magnetic field that contains information stored in the transponder's non-volatile memory during the read/response mode of operation, as will be described. Preferably a predetermined transponder circuit settling time is allowed to elapse after receipt of an excitation field signal before initiating the transmission of a response spread magnetic field signal.

The transponder coil 60 is further coupled through a third, half-wave rectifier diode 89 to a pulse input 91 of a counter 90. Through diode 89, counter 90 counts the positive cycles contained in each excitation magnetic field burst from the reader, in order to determine the mode of operation. The number of cycles within the burst period of the excitation pulse for a read mode of operation (in which the reader stimulates the tag's transponder to emit a response message) is different from (e.g., less than) that for a write mode of operation, during which object identification information is written to the tag.

The output 93 of the counter 90 initiates and controls the mode of operation of a state machine 100. When enabled during a 'read' or 'response' mode of operation, the state machine 100 accesses object information data that has been previously written to or stored in a non-volatile (NX1) memory (shown as an EEPROM) 110, in preparation for transmission of successive bits of the stored object identification data as part of a spreading signal-based reply message.

The state machine 100 may contain an exclusive-OR circuit through which data downloaded from memory modulates or is combined with a PN spreading sequence generated by a PN spreading signal generator 120. This composite spreading signal is then used to controllably gate the FET switch 86, and thereby spread-modulate a response magnetic field produced from the energy stored in capacitor 84 and applied to transponder coil 60.

Each of the counter 90, state machine 100 and memory 110, PN generator 120, as well as a clock generator 130, is powered by the power bus 82 from energy stored in capacitor 83, as shown. Operation of the counter 90, state machine 100, memory 110 and PN generator 120 is controlled by clock signals applied by clock signal line 132 from clock generator 130. The state machine 100 has an output 102 that is coupled to gate input 131 of FET switch 86, the source-drain path of which is coupled across diode 85, as described above. With diode 85 coupled in circuit with reply energy storage capacitor 84, selectively pulsing or turning the FET switch 86 on and off by the output 102 of state machine 100 during read mode of operation will cause the application of the energy stored in capacitor 84 (as modulated by the composite PN sequence) to the transponder's coil 60, and thereby cause a baseband spread magnetic field waveform to be emitted from the transponder coil 60.

For a write or data storage mode of operation, the state machine 100 maintains its output 102 in a disabled state, so that FET switch 86 cannot be gate on and off. During write mode, the value of a respective data bit is encoded into the excitation pulse of the magnetic field burst. As successive excitation bursts are received by the transponder, the contents of the (write) excitation pulse are counted by counter 90, and read by the state machine 100 to be downloaded into memory 110.

As described above, the mode of operation (read or write) of the transponder 50 is defined in accordance with the number of cycles within the excitation pulse period of a magnetic field burst. For purposes of providing a non-limiting example, the read mode of operation may be associated with a smaller number of cycles (e.g., four), than write mode (e.g., eight). Namely, during the read mode of operation, the counter 90 will count a fewer number of positive cycles in each of the magnetic field bursts successively detected by coil 60 and rectified by diode 89.

After receipt of a prescribed number of successive magnetic field bursts that has been determined to be sufficient to power up the tag (e.g., 100, as a non-limiting example), the components of the tag transponder circuitry of FIG. 4 will have been powered up from the voltage on the power bus 82, derived from the energy rectified by diode 81 and stored in capacitor 83, so that clock generator 130 will begin clocking the operation of each of counter 90, state machine 100, memory 110, and PN generator 120. With the transponder circuitry enabled, the counter 90 will begin counting the number of positive cycles of each magnetic field burst. At the end of each burst, the output 93 of the counter 90 to the state machine 100 is representative of the number of pulses counted, and therefore whether the transponder is in read or write mode.

For read mode of operation, the state machine 100 begins reading out object identification data (e.g., one bit at the time) stored in non-volatile memory 110 into a set of internal registers within the state machine, in accordance with the clock signal produced by clock generator 130. Upon completion of, or alternatively in parallel with, this data transfer operation, the state machine 100 begins a reply transmission by exclusive-OR combining the data bits read out from memory with the spreading sequence produced by the PN generator 120. During the reply transmission, state machine 100 gates the FET switch 86 on and off with the exclusive-OR combination of the data bits read out from memory with the spreading sequence from the PN generator 120, so that the transponder emits a direct spread baseband magnetic field reply signal containing the tag identification data accessed from memory.

As described above, the FET switch 86 is selectively turned on by the output 102 of the state machine 100 between successive excitation magnetic field bursts. Because the response emissions from the transponder occur between interrogation bursts from the reader, the tag transponder of the invention is not required to overcome or modulate the exciting signal, so that the range of operation of the transponder (without the need of a battery) is greatly increased. As the FET switch 86 is modulated on and off by the output of the state machine 100 the FET switch places a modulated short across the diode 85, so that energy stored in the capacitor 84 modulates the transponder's coil 60, to cause a spread magnetic field to be emitted as a response signal from the coil. It may be noted that the present invention is not limited to the use of only one form of spread spectrum modulation, and may include a variety of spreading signals such as, but not limited to frequency-hop, pseudo-random digital sequences, chirp, analog spread spectrum and combinations of the same.

The circuitry of the tag reader is diagrammatically illustrated in FIG. 5 and includes a pulse generator 201, which is operative to generate an excitation signal, such as a pulsed 100 KHz magnetic field waveform. The output of the pulse generator 201 is coupled over a link 202 to a multiple excitation and interrogate/reader coil arrangement 210. As a non-limiting example, the reader coil arrangement may be configured in the manner described in co-pending U.S. patent application, Ser. No. 09/159,555, filed coincident herewith, entitled: "Short Range Magnetic Field Transducer," by R. Hash et al, assigned to the assignee of the present application and the disclosure of which is incorporated herein. As described in this co-pending application, the receiver coils are arranged close to the excitation coil and are connected in opposite polarity, so that they produce an electrical output representative of a differential combination of responses from a plurality of magnetic fields impinging thereon, whereby energy from the excitation coil and relatively distant sources is canceled, while producing a useful net output for the field produced by a nearby (object-tagged) transponder.

In FIG. 5, the reader coil arrangement 203 is shown as comprising a pair of spaced apart excitation coils 203-1, 203-2 that are positioned on opposite sides of a region 204 through which a plurality of transponder-tagged objects 210 pass. During successive (periodic) interrogation of the tags, the reader coil arrangement 203 generates a pulsed magnetic field in the region 204 between the two excitation coil elements, so that the coils of one or more tag transponders 50 affixed containers or packages in the region 204, such as a conveyor, will intercept the interrogating magnetic field.

The coil arrangement further includes pairs of reader coils 205-1, 205-2 and 206-1, 206-2 respectively arranged on opposite sides of the spaced apart excitation coils 203-1, 203-2 in the manner described in the above-referenced co-pending application. For reading the various spread magnetic field responses from one or more interrogated tags in the region 204, an output link 212 from the reader coils is further coupled to a clamping circuit 215 (such as a hard limiter). Clamping circuit 215 is operative to limit the signal amplitude of spread reply magnetic field signals generated by the tag transponder in response to the excitation pulses as described above. The output of the clamping circuit 215 is coupled through a band pass filter 217, tuned to the frequency band of the response waveform, to an analog-to-digital (A-D) converter 221. The digitized output of the A-D converter 221 is coupled to a correlator 223, which is operative to correlate the spread signal response emitted from the interrogated tag's transponder, in the manner described above with reference to FIGS. 1 and 2.

As pointed out above, the high probability that no two responses from tag transponders located with the region 204, upon which the excitation magnetic field is incident, will be time-aligned or have exactly the same clock frequency (due to variations in their internal clocks) will tend to decorrelate their responses, even if they commense at the same time. This allows matched filter processing of the responses, for the purpose of individually segregating each response, even though each transponder employs the same PN sequence to spread its own signal.

For this purpose, the reader may employ a matched filter correlation-based signal processor of the type described with reference to FIGS. 6–8 of co-pending U.S. patent application Ser. No. 08/786,232, filed Jan. 21, 1997, by D. Belcher et al, entitled: "Radio Location System for Precisely Tracking Objects by RF Transceiver Tags Which Randomly and Repetitively Emit Wideband Identification Signals," assigned to the assignee of the present application and the disclosure of which is incorporated herein. While the particular application of the PN correlation signal processor of the Ser. No. 08/786,232, application is for identifying first-to-arrive RF signals for triangulation-based location determination, it readily provides for the separate identification of each received time-offset PN sequence. Embedding object identification data in the spreading sequence thereby readily allows for segregation of each return or response from multiple tags using the same PN spreading 'seed'.

In order to optimize the robustness of the independence of the tag information storage and retrieval system of the present invention to package or container orientation, the coil arrangement may include a plurality of relatively orthogonally arranged magnetic field coil sets, arranged as described in the above-referenced co-pending application, so as to produce mutually orthogonal magnetic fields. As a consequence, as a package or object to which a tag/transponder is affixed travels along a conveyor, the tag's read/response coil will encounter the field produced by each of the orthogonal coil arrangement. This ensures that regardless of its package orientation, the tag/transponder cannot escape detection, since all tag orientations will be coupled to at least one of the three excitation fields produced by the multiple coil arrangements. The responses of the respective coil arrangements are coupled to associated readers each of which is configured as shown in FIG. 5, described above. The outputs of the readers may be coupled in turn to a data arbitration processor, which is operative to arbitrate among its three inputs, using a conventional arbitration mechanism (as by selecting the input with the lowest number of errors), to produce a single data output that uniquely identifies the tagged object.

As pointed out previously, the non-volatile memory 110 of the tag's transponder circuit 50 contains a previously stored encoded data sequence representative of the desired object identification information. Depending upon the application, this object ID information may be encoded and downloaded in to the tag's non-volatile memory 110 in a number of ways. For applications where large numbers (e.g., thousands) of tags employ the same object identification information or code sequence, the transponder memory may be laser-programmed ('burned-in'), or alternatively provided with a prescribed metalization pattern at the time of manufacture. For on-the-fly applications, such as in the transportation industry, the transponder's memory may be programmed magnetically by means of a write coil of a magnetic field generator, into which the transponder-embedded Mylar strip is inserted at the time of its use.

As described above, when programming the tag, namely writing object ID data into the transponder's non-volatile memory 110, the number of cycles within the excitation burst period for a write mode of operation (in which the reader stimulates the tag's transponder to store the contents of the magnetic field burst) is not only different from (e.g., greater than) that for the read mode of operation, but is used to represent the data to be written into the tag. Just as in the read mode of operation, upon receipt of a prescribed number of successive excitation magnetic field bursts sufficient to power up the tag (e.g., one hundred, as a non-limiting example), the tag transponder circuitry will have been powered up from the voltage on the power bus 82, from the energy rectified by the diode 81 and stored in capacitor 83.

With the transponder circuitry enabled, the counter 90 begins counting the number of positive cycles of each magnetic field excitation burst. Since, in this (write) mode of operation, the value of a respective data bit is encoded as a prescribed pulse waveform, then as successive positive cycles of a data bit are counted by the counter 90, they are read by the state machine 100 and downloaded into associated non-volatile memory 110.

As will be appreciated from the foregoing description, by exploiting the signal processing advantages of spread spectrum signaling, the present invention is able to substantially improve upon the performance of magnetic field links for object detection and identification. When interrogated by a tag reader, transponders embedded in one or more tags generate spread spectrum modulated magnetic fields that are readily correlated with a reference spreading sequence in a tag reader signal processor employing a matched filter correlation processor, to both detect and identify each responding tag.

While we have shown and described a preferred embodiment of the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of conducting a magnetic field communication comprising the steps of:
   (a) controllably emitting from a transponder a magnetic field modulated with a spreading signal indicative of object data that had been read from a transponder memory in a read mode of operation and previously written to the transponder memory in a write mode of operation; and (b) detecting said magnetic field modulated with said spreading signal by a magnetic field detector of a reader, and processing an output of the magnetic field detector using a signal representative of one of a derivative or integral output of a replica of the spreading signal.

2. A method according to claim 1, wherein step (b) comprises receiving said magnetic field modulated with said spreading signal in step (a) to produce an electrical signal representative thereof, and processing said electrical signal using a replica of said spreading signal.

3. A method according to claim 1, wherein said spreading signal contains object identification information, and wherein step (b) comprises detecting said emitted magnetic field emitted and recovering said object identification information.

4. A method according to claim 1, wherein step (a) comprises stimulating a transponder by means of a coil coupled in circuit with a plurality of energy storage devices that extract and store power to operate said transponder, and provide for emission from said coil of said spreading signal modulated magnetic field from energy contained in an excitation magnetic field signal.

5. A method according to claim 4, wherein step (a) comprises allowing a predetermined transponder circuit settling time to elapse after receipt of said excitation magnetic field signal, before causing said transponder to emit said spreading signal modulated magnetic field.

6. A method according to claim 3, wherein step (a) comprises stimulating plural magnetic field emitters associated with plural objects into emitting magnetic fields modulated with said spreading signal containing information representative of at least one characteristic of respective ones of said plural objects, wherein step (b) comprises detecting plural spreading signal modulated magnetic fields emitted by said plural emitters and generating plural electrical signals representative thereof, and processing said plural electrical signals to recover information associated with respectively different ones of said objects.

7. A system comprising:
   a transponder having a magnetic field emitter that is operative to emit a magnetic field modulated with a spreading signal indicative of object data that had been read from a transponder memory in a read mode of operation and previously written to the transponder memory in a write mode of operation; and
   a detector that is operative to detect said spreading signal modulated magnetic field emitted by said magnetic field emitter and operative to process an electrical signal representative of said magnetic field with one of a derivative or integral output of a replica of said spreading signal.

8. A system according to claim 7, wherein said magnetic field emitter comprises a tag that is attachable to an object and containing a normally unpowered transponder having memory for storing information representative of at least one characteristic of said object, said normally unpowered transponder being powered from energy contained in a magnetic field excitation signal incident thereon, and being operative to controllably emit said magnetic field modulated with said spreading signal.

9. A system according to claim 7, wherein said detector is operative to process an electrical signal representative of said detected magnetic field using a replica of said spreading signal.

10. A system according to claim 8, wherein said spreading signal contains object identification information, and wherein said detector operative to detect said magnetic field emitted by said transponder and recover said object identification information.

11. A system according to claim 7, wherein said transponder coil is coupled in circuit with a plurality of energy storage devices that extract and store power to operate said transponder, and provide for emission of said spreading signal modulated magnetic field from energy contained in said magnetic field excitation signal.

12. A system according to claim 11, wherein transponder is operative to allow a predetermined settling time to elapse after receipt of said magnetic field excitation signal, before emitting said spreading signal modulated magnetic field.

13. A system for storing and retrieving information representative of at least one character of an object comprising:
   a transponder supported at said object and including a magnetic field emitter that is operative to emit a magnetic field modulated with a spreading signal containing said information representative of at least one characteristic of said object, said transponder having a memory and a write mode of operation for writing object data into memory and a read mode of operation for reading object data and emitting a response message based object data in memory;
   a reader that is operative to detect said spreading signal modulated magnetic field emitted by said magnetic field emitter and to generate an electrical signal representative thereof wherein said transponder is operative in a read or write mode of operation based on a signal from the reader; and electrical signal to recover said information, using a signal representative of said magnetic field with one of a derivative or integral output of a replica of said spreading signal.

14. A system according to claim 13, wherein said reader is operative to generate a magnetic field signal that stimulates said transponder into emitting said magnetic field modulated with said spreading signal containing said information.

15. A system according to claim 13, said processor is operative to process said electrical signal with a signal associated with a replica of said spreading signal.

16. A system according to claim 13, wherein said reader is operative to generate a magnetic field signal that stimulates plural ones of said transponder into emitting magnetic fields modulated with said spreading signal containing information representative of at least one characteristic of respective objects with which said plural ones of said transponder are attached, and is operative to detect plural spreading signal modulated magnetic fields emitted by said plural ones of said transponder and to generate plural electrical signals representative thereof, and wherein said processor that is operative to process said plural electrical signals to recover information associated with respectively different ones of said objects.

* * * * *